United States Patent [19]

Farbridge et al.

[11] Patent Number: 5,076,512

[45] Date of Patent: * Dec. 31, 1991

[54] VENTRAL SEGMENTED NOZZLES FOR PROMOTING RAPID TEMPERATURE AND PRESSURE DECAY

[75] Inventors: Joseph E. Farbridge, Thornhill; Douglas Garland, Rexdale, both of Canada; Albert F. Schexnayder, Cincinnati, Ohio

[73] Assignees: Boeing Canada Ltd., Downsview, Canada; General Electric Company, Cincinnati, Ohio

[*] Notice: The portion of the term of this patent subsequent to Aug. 14, 2007 has been disclaimed.

[21] Appl. No.: 307,719

[22] Filed: Feb. 8, 1989

[51] Int. Cl.[5] .............................................. B64C 29/00
[52] U.S. Cl. ................................ 244/23 D; 244/12.4; 244/12.5
[58] Field of Search ................ 244/23 A, 23 B, 23 D, 244/12.4, 12.5, 110 B; 60/232; 239/265.19

[56] References Cited

U.S. PATENT DOCUMENTS

| | | | |
|---|---|---|---|
| 3,099,423 | 7/1963 | Wild et al. ........................ | 244/23 D |
| 3,174,707 | 3/1965 | Ricard .............................. | 244/12.5 |
| 3,310,260 | 3/1967 | Chichester-Miles .............. | 244/12.5 |
| 3,380,661 | 4/1968 | Markowski ...................... | 239/265.29 |
| 3,545,210 | 12/1970 | Cresswell ......................... | 244/12.5 |

OTHER PUBLICATIONS

National Aeronautics and Space Administration Exhaust Jet Wake and Thrust Characteristics of Several Nozzles Designed for VTOL Downwash Suppression Tests In and Out of Ground Effect with 70° F. and 1200° F. Nozzle Discharge Temperatures by: C. C. Higgins, D. P. Kelly and T. W. Wainwright.

Primary Examiner—Joseph F. Peters, Jr.
Assistant Examiner—Christopher P. Ellis
Attorney, Agent, or Firm—Rogers, Bereskin & Parr

[57] ABSTRACT

A thrust deflector system for VSTOL aircraft. The thrust directing system consists of a number of spaced-apart, downwardly facing openings along the bottom of the fuselage. The openings are fluidly connected with the outlet of the aircraft engine so that pressurized gas from the aircraft engine is discharged through the openings and away from the fuselage in discrete spaced-apart jets.

6 Claims, 5 Drawing Sheets

VENTRAL SEGMENTED NOZZLES FOR PROMOTING RAPID TEMPERATURE AND PRESSURE DECAY

FIELD OF THE INVENTION

This invention relates to lift and propulsion systems for aircraft, and more particularly to a thrust deflector for vertical and short take-off and landing aircraft

BACKGROUND OF THE INVENTION

The term "VSTOL aircraft" is used herein to refer to both vertical take-off and landing aircraft and short take-off and landing aircraft. It is known in the art of VSTOL aircraft to deflect thrust from the engines of the aircraft downwardly for take-off or landing. Typical methods for deflecting thrust from the engines include deflector blades, rotatable engine nozzles and rotating the entire power unit.

Typical VSTOL aircraft, particularly those capable of attaining high speeds, use a combustion engine which acts as a pressurized gas generator to generate pressurized gas for propelling the aircraft. A problem faced with VSTOL aircraft is that the temperature of the pressurized gas is quite high, typically in the range of 1,000° F. and higher, and the pressure is also considerable. When the pressurized gas is directed downwardly, the high temperature and pressure tends to melt tarmac, erode concrete and even heat metal plates below the aircraft to unacceptably high temperatures. The result is that operation of VSTOL aircraft is restricted, and take-off or landing must often be performed with some forward movement to reduce the damage.

SUMMARY OF THE INVENTION

According to the present invention there is provided for VSTOL aircraft having a pressurized gas generator, the pressurized gas generator having an outlet through which the pressurized gas is discharged and, a fuselage having a bottom, a front and a rear, a thrust directing system. The thrust directing system has a plurality of spaced apart, downwardly facing openings along the bottom of the fuselage. The openings are fluidly connected with the outlet of the pressurized gas generator so that pressurized gas being discharged through the pressurized gas outlet is further discharged through the openings and away from the fuselage in discrete, spaced-apart jets.

The openings can further be provided with at least one vectoring flap for further directing the jet being discharged from the opening. The flap is moveable to direct the jet from a vertical direction to at least one rearwardly direction.

Air introduction means may also be provided which fluidly communicate with the space between the nozzles for introducing air into the space between the nozzles.

BRIEF DESCRIPTION OF THE DRAWINGS

For a better understanding of the present invention, and to show more clearly how it may be carried into effect, reference will now be made by way of example to the accompanying drawings, in which.

DETAILED DESCRIPTION OF THE INVENTION

Decay of temperature and pressure of a jet of hot air being discharged from an engine nozzle arises from the mixing of the jet with ambient air surrounding the jet. A small diameter jet decays much more rapidly than a large diameter jet in the same physical length. The thrust directing system of the present invention divides the large jet emanating from the aircraft engine into a number of small jets. The small jets are spaced apart to promote their mixing with ambient air. This results in considerably more rapid temperature and pressure decay than that of the large jet.

Figure 1:
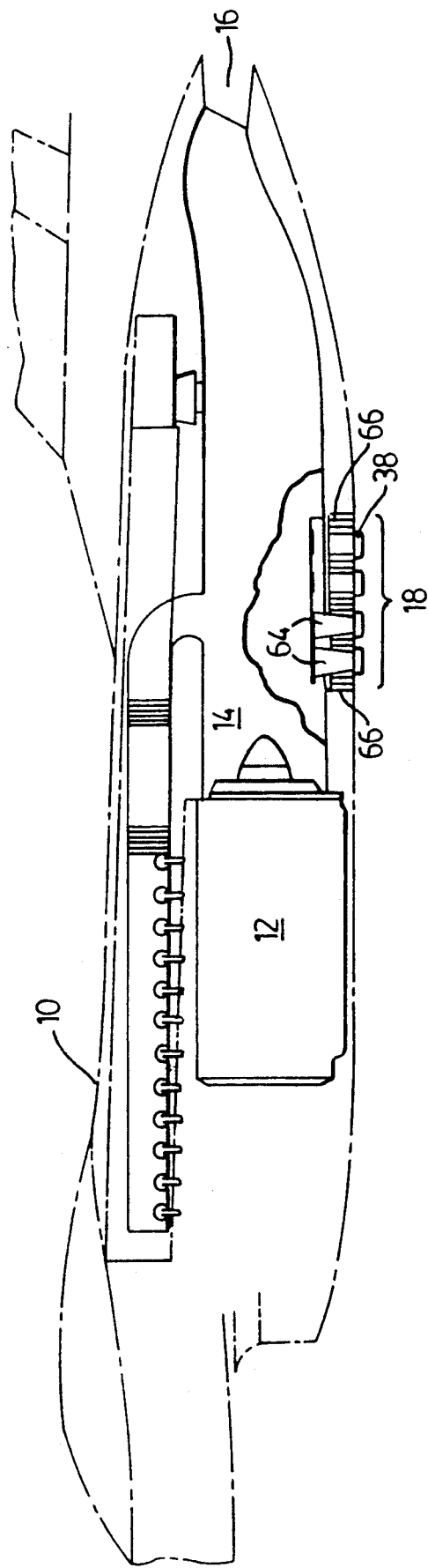
FIG. 1 shows a diagramatic side view of a VSTOL aircraft embodying a thrust directing system according to the present invention.

Referring to FIG. 1, the outline of a portion of the fuselage 10 of an aircraft is shown in dashed lines. The aircraft has an engine 12 which acts as a pressurized gas generator for generating pressurized gas by the combustion of fuel. Pressurized gas leaves the engine 12 through the passage 14. A portion or all of the pressurized gas is discharged from the rearward opening 16 of the aircraft fuselage 10. Discharge of pressurized gas from the rearward outlet 16 provides the principal horizontal thrust for the aircraft when flying at high forward speeds.

For VSTOL operation, a portion of the pressurized gas from engine 10 is diverted from the passage 14 and through a series of downwardly facing nozzles 20 in the bottom of the fuselage 10 in the ventral area 18. This will of course require throttling of the passage 14 which may be achieved, for example, by blocking passage 14 downstream of the nozzles or obstructing the outlet 16 in any conventional manner. The nozzles 20 are shown in more detail in FIGS. 2 and 3 and will be described more fully below. The fuselage 10 has a front toward the left of FIG. 1 and a rear toward the right of FIG. 1.

Figure 4:
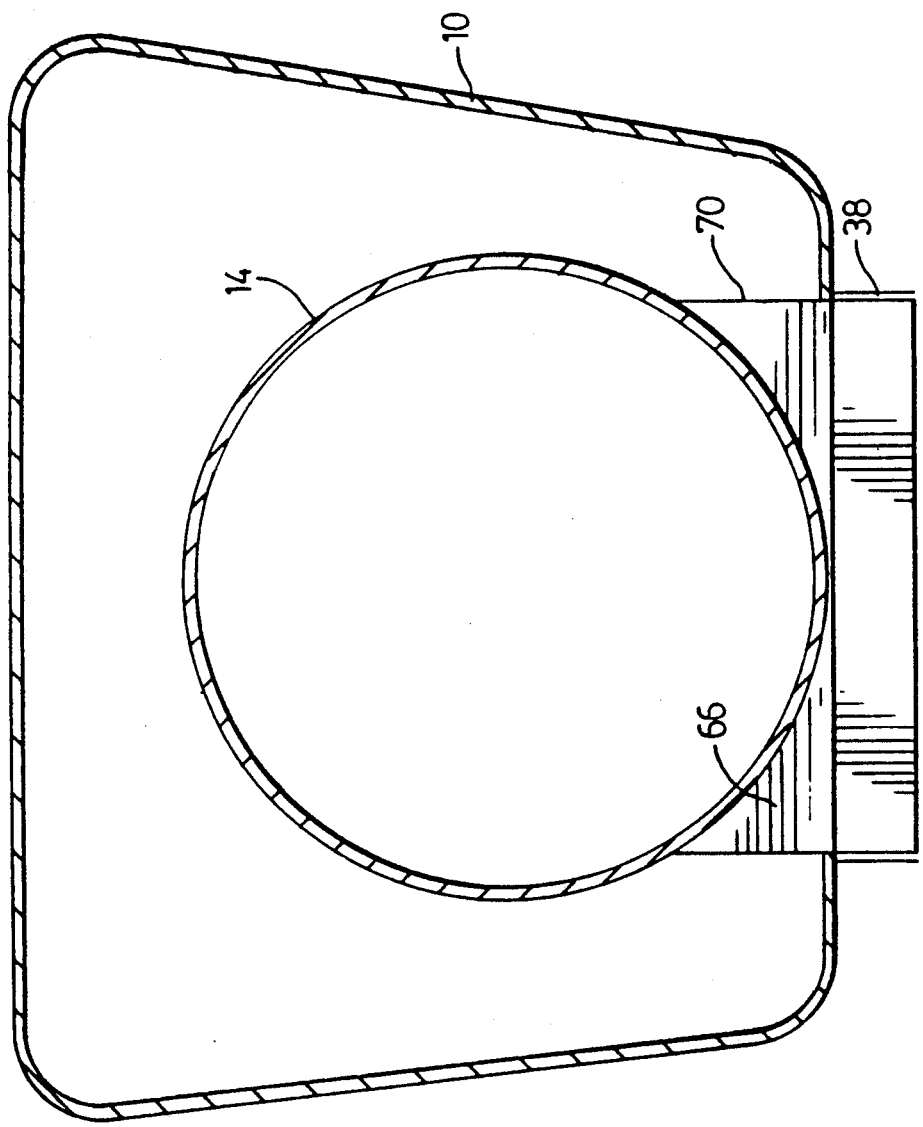
FIG. 4 is a cross sectional view through a section of an aircraft fuselage showing the fluid connection between the nozzles and the pressurized fluid passage.
Figure 5:
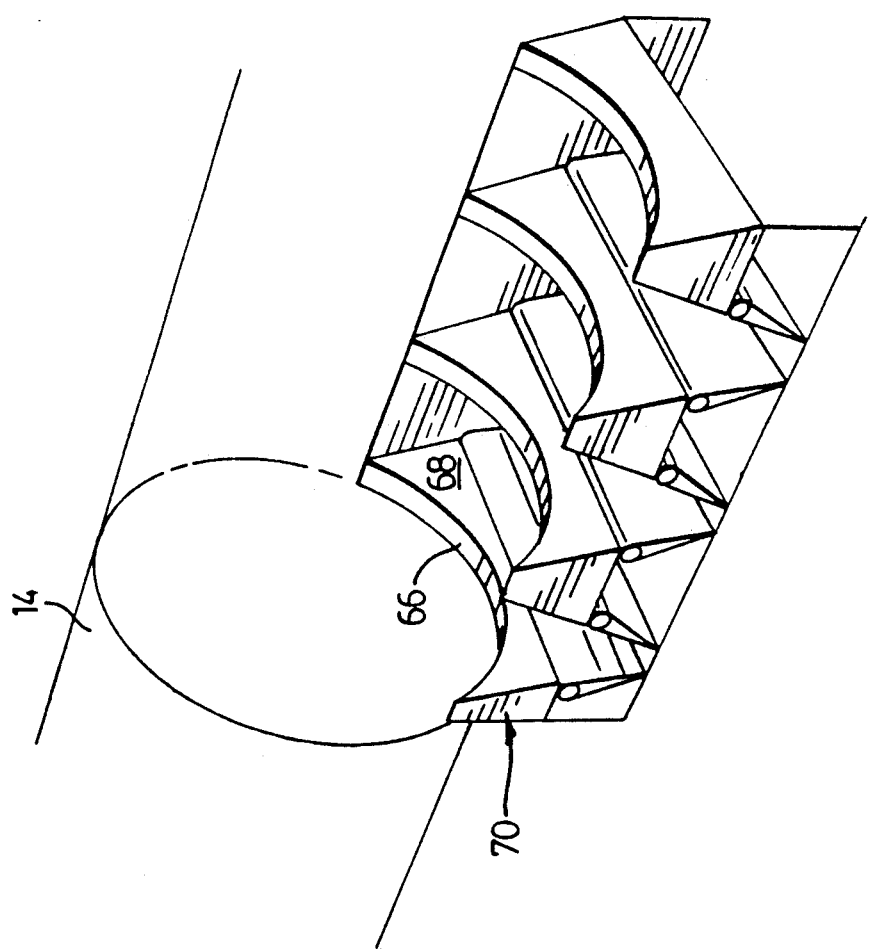
FIG. 5 is a perspective view showing the fluid connection between the nozzles and the pressurized fluid passage.

Fluid communication between the nozzles 20 and the passage 14 may be achieved by providing an opening in the duct 14 above the nozzles 20 and dividing the opening into smaller openings 64 above each nozzle 20. The opening may be divided by beams or dividers of a channel shaped cross section such as shown at reference 66 in the Figures. The downwardly depending legs 68 of the dividers would extend to the fuselage 10 adjacent the nozzles 20. The ends of the dividers 66 may be left open to fluidly communicate with the engine bay between the passage 14 and the fuselage 10. Such an opening is identified at reference 70 in FIGS. 4 and 5.

Figure 2:
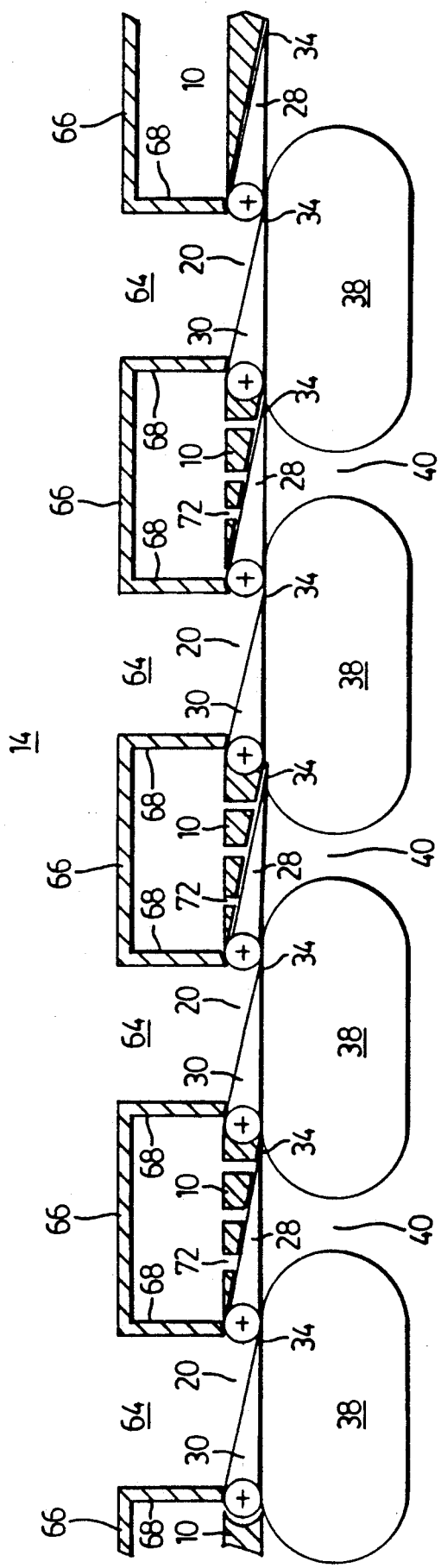
FIG. 2 shows a cross sectional view of a thrust directing system according to the present invention, perpendicular to the rotational axes of the flaps and showing the flaps in their folded position; and, FIG. 3 is a cross sectional view according to FIG. 2 but showing the flaps rotated approximately 90° clockwise.
Figure 3:
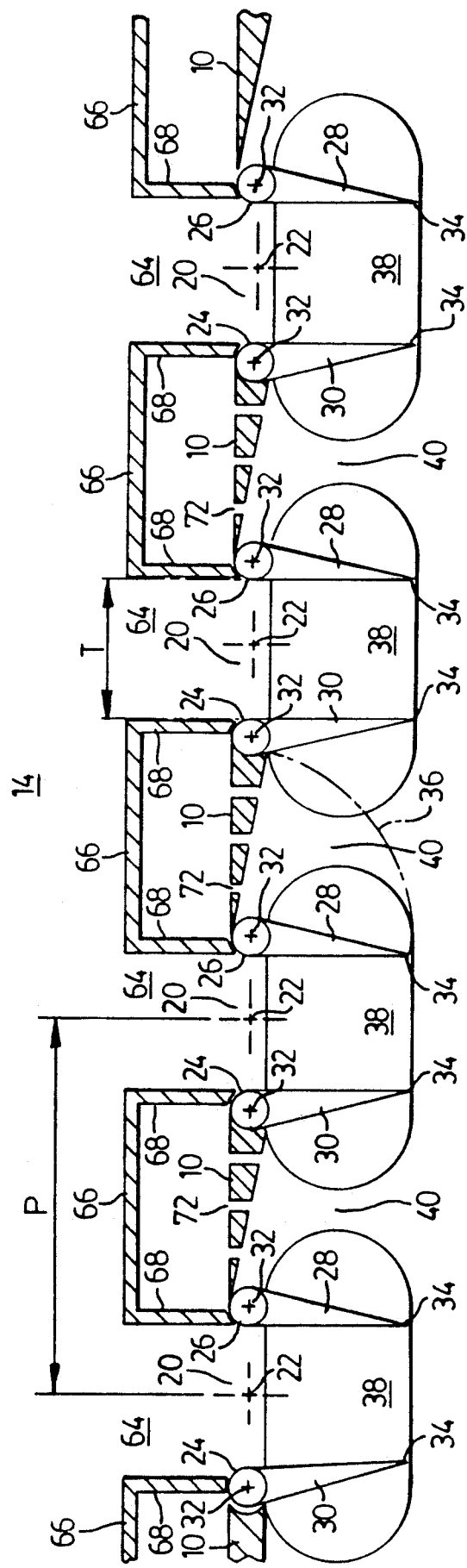

Referring first to FIG. 3, the nozzles 20 are defined by a number of spaced-apart, downwardly facing openings along the bottom of the fuselage 10. The interior of the fuselage 10 is above the openings 20 as illustrated in FIGS. 2 and 3. The openings are fluidly connected with the outlet of the pressurized gas generator by means such as ducts extending from the passage 14 (not shown). The openings 20 as shown are usually generally rectangular, having a longitudinal axis 22 running along their lengths and spanwise across the fuselage. The openings 20 have a forward side 24 toward the front of the fuselage and a rearward side 26 toward the rear of the fuselage 10. The forward sides 24 and rearward sides 26 are generally parallel to the longitudinal axes 22.

Each of the openings 20 is provided with a forward flap 28 adjacent the forward side 24 of the opening. The openings are further provided with a rearward flap 30 adjacent the rearward side 26 of the openings 20.

Each of the forward and rearward flaps, 28 and 30 respectively, are rotatable about an axis 32 generally parallel to the longitudinal axis 22. The forward and rearward flaps, 28 and 30 respectively, further have a trailing edge 34 distal the axis 32 and generally parallel to it. Rotation of the flaps can be achieved by various means known in the art such as attaching the flaps to a shaft coaxial with the axis 32 and journaling the shaft in a bearing on either side of the flaps. Various known mechanical or hydraulic devices such as levers and cylinders, screwdrives, gears, sprockets and chains etc. can then be used to rotate the shaft and accordingly rotate the flaps.

The flaps have a folded position shown in FIG. 2 wherein the forward flaps 28 lie along the fuselage 10 with the trailing edges 34 of the forward flaps 28 facing rearwardly. In the folded position the rearward flaps 30 extend across the openings 20, closing the openings 20. This folded position would be used for forward flight of the aircraft and in this position the thrust from the engine 12 would be directed entirely through the rearward opening 16.

The flaps are rotatable clockwise from the position shown in FIG. 2 so that the trailing edges 34 describe an arc, such as 36 shown in dashed outline in FIG. 3, depending below the fuselage 10.

When the flaps are rotated to the position shown in FIG. 3, pressurized gas passing through the openings 20 is directed in a generally downwardly direction and thrust resulting from this passage of pressurized gas acts in a generally upwardly manner. It will be apparent that as the flaps are rotated from the position shown in FIG. 3 to the position shown in FIG. 2, the discharge of pressurized gas through the openings 20 will be guided by the flaps from a downwardly direction toward a rearwardly direction. In this manner the direction of thrust is moved from the vertical toward the horizontal. If the flaps are rotated clockwise from the position shown in FIG. 3, the resulting thrust will have both upward and rearward components.

To ensure that pressurized gas being discharged from the nozzles 20 does not flow out laterally from the ends of the ducts, end plates 38 are provided across the ends of the nozzles 20. The end plates 38 are generally flat plates depending from the fuselage 10 adjacent the outer ends of the flaps. Gaps 40 are left between adjacent end plates 38 to permit air to enter laterally between the end plates 38 into the space between the nozzles 20.

The flaps, particularly the forward flaps 28, and the portion of the fuselage 10 between the flaps, may be formed to co-operating, generally teardrop shaped configurations as shown in FIGS. 2 and 3. This configuration has the advantage of minimizing the projection of the flaps below the fuselage in the folded position thereby minimizing aerodynamic drag.

A drawback to placing such nozzles in the ventral area of an aircraft is that a "suck down effect" is created countering, to some extent, the vertical thrust resulting from discharge of the pressurized gas from the openings 20. It has been found that the suck down effect may be minimized by introducing air into the spaces between the jets of pressurized gas emanating from the openings 20. Various mechanisms may be used to introduce air into this area. One such method is to provide ports 72 in FIG. 3, through the portions of the fuselage 10 separating the openings 20. The ports 72 may fluidly communicate with the interior of the engine bay through the interior of the dividers 66 and through the open ends 70 of the divider 66, to suck air from the engine bay as described above.

The separation between the longitudinal axes of adjacent openings 20 is referred to as the pitch of the nozzles and is indicated by reference P in FIG. 3. The distance across the opening is referred to as the thickness of the opening. The openings further have a length, not shown, which is the spanwise breadth of the opening. It has been found that suitable performance can be obtained from openings having a pitch to thickness ratio on the order of 3 to 10 and a ratio of length to thickness on the order of 10 to 20.

Various other modifications and changes will occur to those skilled in the art without departing from the scope of the invention as defined in the attached claims.

We claim:

1. A thrust directing system for VSTOL aircraft having a pressurized gas generator located in an engine bay, said pressurized gas generator having an outlet through which pressurized gas is discharged, said aircraft further having a fuselage, said thrust directing system comprising:
a plurality of spaced-apart, downwardly facing openings along the bottom of said fuselage, said openings being fluidly connected with said outlet of said pressurized gas generator so enabling said pressurized gas being discharged through said pressurized gas outlet to be further discharged through said openings and away from said fuselage in discrete, spaced-apart jets; and, air introduction means fluidly communicating with said engine bay and the spaces between said openings for introducing air from said engine bay into said spaced between said openings.

2. A thrust directing system according to claim 1 wherein at least one of said openings is provided with at least one vectoring flap for further directing said jet being discharged from said opening, said flap being movable to direct said jet from a vertical direction to at least one rearwardly direction.

3. A thrust directing system according to claim 2 wherein each of said flaps is movable across said opening to close said opening.

4. A thrust directing system according to claims 1, 2 or 3 wherein said openings are generally rectangular and have a longitudinal axis extending across the bottom of said fuselage.

5. A thrust directing system according to claims 2 or 3 wherein:
said openings are generally rectangular having a longitudinal axis extending across the bottom of said fuselage and having a forward side toward the front of said fuselage and a rearward side toward the rear of said fuselage, said forward and rearward sides being generally parallel to said longitudinal axis of said opening;

each of said openings being provided with a forward flap adjacent said forward side and a rearward flap adjacent said rearward side;

each of said flaps being rotatable about a rotational axis, said rotating axis being generally parallel to said longitudinal axis;

each of said flaps having a trailing edge distal and generally parallel to said rotational axis;

said flaps having a folded position wherein said forward flaps lie along said fuselage with said trailing edges of said flaps facing rearwardly and said rearward flaps lying across said adjacent openings; and, said flaps are rotatable, from said closed position, about said rotational axis whereby said trailing edge moves forwardly in an arc depending below said fuselage at least so far as to be vertically below said rotational axis.

6. A thrust directing system according to claims 2 or 3 wherein:

said openings are generally rectangular having a longitudinal axis extending across the bottom of said fuselage and having a forward side toward the front of said fuselage and a rearward side toward the rear of said fuselage, said forward and rearward sides being generally parallel to said longitudinal axis of said opening;

each of said openings being provided with a forward flap adjacent said forward side and a rearward flap adjacent said rearward side;

each of said flaps being rotatable about a rotational axis generally parallel to said longitudinal axis;

each of said flaps having a trailing edge distal and generally parallel to said rotational axis;

said flaps having a folded position wherein said forward flaps lie along said fuselage with said trailing edges of said flaps facing rearwardly and said rearward flaps lying across said adjacent openings; and, said flaps are rotatable, from said closed position, about said rotational axis whereby said trailing edge moves forwardly in an arc depending below said fuselage at least so far as to be vertically below said rotational axis; and, wherein said openings have a length to thickness ratio of from 10 to 20 and said openings have a pitch to thickness ratio of from 3 to 10.

* * * * *

UNITED STATES PATENT AND TRADEMARK OFFICE
CERTIFICATE OF CORRECTION

PATENT NO. :   5,076,512
DATED      :   December 31, 1991
INVENTOR(S):   Joseph E. Farbridge et al.

It is certified that error appears in the above-identified patent and that said Letters Patent is hereby corrected as shown below:

Title page, item [75], Inventors: add the following:

--Brian E. Meyer, Loveland, Ohio;
  Charles F. Ritchie, Cincinnati, Ohio--

Signed and Sealed this

Third Day of August, 1993

Attest:

MICHAEL K. KIRK

Attesting Officer    Acting Commissioner of Patents and Trademarks